United States Patent
Van Luchene

(10) Patent No.: US 7,072,850 B1
(45) Date of Patent: Jul. 4, 2006

(54) METHOD AND APPARATUS FOR PROCESSING A SUPPLEMENTARY PRODUCT SALE AT A POINT-OF-SALE TERMINAL

(75) Inventor: Andrew S. Van Luchene, Norwalk, CT (US)

(73) Assignee: Walker Digital, LLC, Stamford, CT (US)

( * ) Notice: Subject to any disclaimer, the term of this patent is extended or adjusted under 35 U.S.C. 154(b) by 595 days.

(21) Appl. No.: 09/045,518

(22) Filed: Mar. 20, 1998

Related U.S. Application Data

(63) Continuation-in-part of application No. 08/920,116, filed on Aug. 26, 1997, now Pat. No. 6,119,099, which is a continuation-in-part of application No. 08/822,709, filed on Mar. 21, 1997, now Pat. No. 6,267,670.

(51) Int. Cl.
*G06F 17/60* (2006.01)

(52) U.S. Cl. .............................. 705/14; 705/19; 705/20; 705/21; 705/23; 705/24

(58) Field of Classification Search ................... 705/14, 705/19, 20, 21, 23, 24
See application file for complete search history.

(56) References Cited

U.S. PATENT DOCUMENTS

| | | | |
|---|---|---|---|
| 3,573,747 A | 4/1971 | Adams et al. ........... 340/172.5 |
| 3,637,999 A | * 1/1972 | Pappas ....................... 235/94 |
| 4,108,361 A | 8/1978 | Krause ....................... 235/375 |
| 4,120,452 A | * 10/1978 | Kimura et al. .............. 235/381 |
| 4,323,770 A | 4/1982 | Dieulot et al. ............. 235/325 |
| 4,494,197 A | 1/1985 | Troy et al. .................. 364/412 |

(Continued)

FOREIGN PATENT DOCUMENTS

| | | | |
|---|---|---|---|
| FR | 95 07963 | * | 3/1997 |
| WO | WO 97/46961 | | 12/1997 |

OTHER PUBLICATIONS

Webster's II, New Riverside University Dictionary, 1994, Houghton–Mifflin Company, pp 450.*
Myhre, James W., "Examiner's Affidavit", dated Feb. 22, 2001.
"Cape Town", Reuters, Nov. 8, 1979, Thursday PM Cycle.
"Save The Mark", Financial Times (London), Feb. 1, 1983, Section I; Men & Matters at p. 12.
Jan Greene, "Farm Bills Please Associations; National Grocers Association", Supermarket News, Dec. 23, 1985, vol. 35 at p. 6.
"POS Spectrum: a Lottery Looks to POS for Growth", POS News, Jan. 1989 vol. 5, No. 7 at p. 8.

(Continued)

*Primary Examiner*—James W. Myhre
(74) *Attorney, Agent, or Firm*—Dean P. Alderucci

(57) ABSTRACT

Upsells are made accessible to customers so customers may select upsells as they select items in their purchase. Each upsell has an associated rounding code. For example, the rounding code may be determinable from a bar code printed on an adhesive label that is affixed to the upsell. A POS terminal receives the rounding code, by scanning the label or other means. Typically, the rounding code is read in a manner similar to the manner in which items in the purchase are read by the POS terminal. The purchase price (sum of all item prices and any tax) is rounded, based on the rounding code. For example, given a purchase price of $8.26, and a rounding code that indicates a multiple of $5, the purchase price would be rounded up to the next-higher multiple of $5 ($10.00). The customer would pay the rounded price in exchange for the items and the upsell. Thus, the difference between the rounded price and the purchase price ($10.00–$8.26 =$1.74) is effectively the price the customer pays for the upsell.

7 Claims, 10 Drawing Sheets

U.S. PATENT DOCUMENTS

| | | | |
|---|---|---|---|
| 4,500,880 A | 2/1985 | Gommersall et al. | 340/825.35 |
| 4,669,730 A | 6/1987 | Small | 273/138 |
| 4,677,553 A | 6/1987 | Roberts et al. | 364/412 |
| 4,689,742 A | 8/1987 | Troy et al. | 364/412 |
| 4,760,247 A | 7/1988 | Keane et al. | 235/454 |
| 4,764,666 A * | 8/1988 | Bergeron | 463/25 |
| 4,815,741 A | 3/1989 | Small | 273/138 |
| 4,825,045 A | 4/1989 | Humble | 235/383 |
| 4,839,507 A | 6/1989 | May | 235/381 |
| 4,854,590 A | 8/1989 | Jolliff et al. | 273/138 |
| 4,859,838 A | 8/1989 | Okiharu | 235/383 |
| 4,882,473 A | 11/1989 | Bergeron et al. | 235/380 |
| 4,910,672 A | 3/1990 | Off et al. | 364/405 |
| 4,922,522 A | 5/1990 | Scanlon | 379/95 |
| 4,937,853 A | 6/1990 | Brule et al. | 379/96 |
| 4,982,337 A | 1/1991 | Burr et al. | 364/479 |
| 4,993,714 A | 2/1991 | Golightly | 273/138 |
| 5,056,019 A | 10/1991 | Schultz et al. | 364/405 |
| 5,119,295 A | 6/1992 | Kapur | 364/412 |
| 5,177,342 A | 1/1993 | Adams | 235/379 |
| 5,200,889 A * | 4/1993 | Mori | 705/14 |
| 5,216,595 A | 6/1993 | Protheroe | 364/412 |
| 5,223,698 A | 6/1993 | Kapur | 235/375 |
| 5,231,569 A | 7/1993 | Myatt et al. | 364/408 |
| 5,239,165 A | 8/1993 | Novak | 235/375 |
| 5,243,515 A | 9/1993 | Lee | 364/401 |
| 5,262,941 A | 11/1993 | Saladin et al. | 364/408 |
| 5,269,521 A * | 12/1993 | Rossides | 705/14 |
| 5,274,547 A | 12/1993 | Zoffel et al. | 364/408 |
| 5,283,731 A | 2/1994 | Lalonde et al. | 364/401 |
| 5,287,268 A | 2/1994 | McCarthy | 364/405 |
| 5,297,031 A | 3/1994 | Gutterman et al. | 364/408 |
| 5,309,355 A | 5/1994 | Lockwood | 364/401 |
| 5,371,345 A * | 12/1994 | LeStrange et al. | 235/380 |
| 5,420,606 A | 5/1995 | Begum et al. | 345/156 |
| 5,440,108 A * | 8/1995 | Tran et al. | 235/381 |
| 5,450,938 A * | 9/1995 | Rademacher | 194/206 |
| 5,459,306 A | 10/1995 | Stein et al. | 235/383 |
| 5,491,326 A * | 2/1996 | Marceau et al. | 235/381 |
| 5,504,475 A | 4/1996 | Houdou et al. | 340/825.35 |
| 5,572,653 A | 11/1996 | DeTemple et al. | 395/501 |
| 5,592,375 A | 1/1997 | Salmon et al. | 395/207 |
| 5,592,376 A | 1/1997 | Hodroff | 395/214 |
| 5,604,343 A * | 2/1997 | Curry et al. | 235/492 |
| 5,611,052 A | 3/1997 | Dykstra et al. | 395/238 |
| 5,615,269 A | 3/1997 | Micali | 380/49 |
| 5,620,182 A * | 4/1997 | Rossides | 273/138.2 |
| 5,621,201 A | 4/1997 | Langhams et al. | 235/380 |
| 5,632,010 A | 5/1997 | Briechle et al. | 345/1 |
| 5,664,115 A | 9/1997 | Fraser | 705/37 |
| 5,869,826 A * | 2/1999 | Eleftheriou | 235/380 |
| 5,999,914 A * | 12/1999 | Blinn et al. | 705/26 |
| 6,088,682 A | 7/2000 | Burke | 705/17 |
| 6,112,191 A | 8/2000 | Burke | 705/41 |

OTHER PUBLICATIONS

Robert Kuttner, "Computers May Turn The World Into One Big Commodities Pit", Business Week, Sep. 11, 1989 Economic Viewpoint Section at p. 17.

Michael Schrage, "An Experiment in Economic Theory; Labs Testing Real Markets", The Record, Nov. 26, 1989, Business Section at p. B01.

"Let's Play the Cash Register Receipts Lottery", The New York Times, Dec. 25, 1990, Late Edition—Final, Section 1 at p. 30.

"Philips Offers Customers Financing Through Citicorp; Philips Medical Systems North America, Citicorp North America Inc.", Health Industry Today, Jun. 1991, vol. 54; No. 6; at p. 4.

Laura Del Rosso, Marketel Says It Plans to Launch Air Fare 'Auction' in June; Marketel International Inc., Travel Weekly, Apr. 19, 1991, vol. 50; No. 34 at p. 1.

Jeff Pelline, "Travelers Bidding on Airline Tickets SF Firm Offers Chance For Cut–rate Fares", The San Francisco Chronicle, Aug. 19, 1991, Monday, Final Edition at p. A4.

Laura Del Rosso, "Ticket–bidding Firm Closes Its Doors; Marketel International; Brief Article", Travel Weekly, Mar. 12, 1992, vol. 51; No. 21; at p. 1.

"Winn–Dixie/The Salvation Army Report Contribution For War Against Hunger", PR Newswire, Jun. 10, 1993, Financial News Section.

Jeanne Jones, "Data Readers Streamline Management; Scanner Technology Aids Retailers As Well As Plants, Wholesalers", The Houston Post, Jun. 26, 1994, Business Section at p. D1.

Phillip Fiorini, "'No Place for Penny?'/ Smallest Coin Doesn't Make Cents to Some", USA Today, Jul. 29, 1994, News Section at p. 1A.

Alison Smith, "Survey of UK Consumer Credit and Asset Finance", Financial TImes, Nov. 3, 1994, at p. VI.

Tom Andreoli, Jeff Borden, Beth Healy, Steven R. Strahler and Mark Veverka, "Cash Machines Offer a Whole Lotto Money for Withdrawal; An Unfortunate Juxtaposition; Block The Metaphor!; Something Street Talk; Fishy in Springfield; State Street Sears?; Champion as Underdog; A 'Whole Language' Graduate", Crain's Chicago Business at p. 8.

"Spain: BBV Launches New Card", Cards International, Jun. 22, 1995 at p. 5.

Jim Knippenberg "Psst! Will Local Radio Empires Strike Back?", The Cincinnati Enquirer, Jul. 23, 1995 at p. F01.

"CYBER BID", Net Fund Ltd., Copyright 1996 Brochure.

Kimberlyt Hadley, "Pastors Praying Anti–arson Effort Will Burn Bias", The Nashville Banner, Jul. 26, 1996 at p. A13.

John Gapper, "Nat West Reports Rise in Bad Debt", Financial Times, Jul. 31, 1996,London Edition 3, News Section: UK at p. 09.

"Lynx Technology: Lynx to Provide Business Leasing Programme Through Schroder Leasing", M2 Presswire, Aug. 9, 1996.

Paul Taylor, "Towards a Dream Market", Financial Times (London), Sep. 4, 1996, Survey Section at p. 03.

Gilbert Rehayem, "Opinion: X–Press Betting", La Fleur's Lottery World, Feb. 7, 1997 at p. 4.i.

Michelle Singletary, "Electronic World, Inchjecked Problem? U.S. Move to Paperless Payments Raiese Worries About Those Who Don't Use Banks", The Washington Post, Mar. 4, 1997, Financial Section at p. C01.

"Avco Financial Services", NHFA, (http://www.homefurnish.com/NHFA/avco.htm), download date: May 23, 1997.

"Products and Services: Checkout Direct", Catalina Marketing Corporation, (http://catalinsmktg.com/prodedir.htm), download date: May 29, 1997.

Bertram V. Burke, "Funneling Change to Useful Pursuits", The New York Times, Jun. 9, 1997, Section D; at p. 2. (Note: article on 2nd page of attached copy).

"The Key to Your Identity; Falling Costs will Allow Fingerprint Verification to be Widely Used, Reports Geoff Nairn", Financial Times (London), Jul. 15, 1997, US Edition 1, Technology Section at p. 12.

"The United Computer Exchange, How It All Works", The United Computer Exchange Corporation, (http://www.uce.com/howitworks), download date: Jul. 23, 1997.

"Classifieds2000: The Internet Classifieds", Classifieds2000, Inc., (http://www.classifieds2000.com/cgi-cls/Display.exe?C2K+aboutus), download date: Aug. 6, 1997.

"General Trading Information and Terms Provided by tradingfloor.com", Trading Floor, (http://www.tradingfloor.com/info.htm), download date: Aug. 14, 1997.

"NASDAQ", (http://home.axford.com/corfin/corf11.htm), download date: Aug. 15, 1997.

Kathy Prochaska–Cue, "Acquiring Credit", (http://ianrww.unl.edu/IANR/PUBS/NEBFACTS/NF91-2.HTM), download date: Sep. 3, 1997.

"Welcome to ONSALE: Auction Supersite", ONSALE, (http://www.onsale.com/category/inv/00124972.htm), download date: Sep. 8, 1997.

"About IAO", Interactive Auction Online, (http://www.iaoacution.com/about.htm), download date: Sep. 8, 1997.

John Kelsey, Bruce Schneier, "Conditional Purchase Orders", Fourth ACM Conference on Computer Communication Security, Apr. 1997, ACM Press at p. 117–124.

Jim Kirk, "Digital Promotions Make Quick Point—McDonald's Testing New Technology on its Menus", Chicago Tribune, Dec. 26, 1997 at p. 1–2.

Kimball Livingston, "In–Store Systems—VideOcart Redux", RT Magazine, Mar. 1998 at p. 29–30.

* cited by examiner

| ITEM IDENTIFIER 40 | DESCRIPTION 42 | PRICE 44 | TAXABLE STATUS 46 |
|---|---|---|---|
| 112230 | 1998 CALENDER | $9.95 | YES |
| 112231 | 1996 TAX MANUAL | $34.00 | YES |
| 112232 | OCTOBER '97 WEB MAGAZINE | $2.95 | YES |
| 112233 | WAR AND PEACE | $15.00 | YES |
| 112234 | BIBLE | $30.00 | YES |
| 112235 | COLLEGE GUIDE | $17.50 | YES |
| 112236 | PATENT LAW 2000 | $1.50 | YES |

FIG. 4

| ROUNDING CODE IDENTIFIER 56 | ROUNDING MULTIPLE 58 | FIXED VALUE 60 |
|---|---|---|
| 567 | $1 | $1 |
| 890 | $5 | $5 |
| 327 | $10 | $10 |

FIG. 5

| TRANSACTION IDENTIFIER 126 | DATE 128 | TIME 130 | POS TERMINAL IDENTIFIER 132 | REVENUE 134 |
|---|---|---|---|---|
| 12345678 | 12/1/99 | 10:04 AM | 7 | $30.00 |
| 12345679 | 12/1/99 | 11:15 AM | 3 | $4.28 |

FIG. 7

METHOD AND APPARATUS FOR PROCESSING A SUPPLEMENTARY PRODUCT SALE AT A POINT-OF-SALE TERMINAL

The present application is a continuation-in-part of U.S. patent Application Ser. No. 08/920,116, entitled METHOD AND SYSTEM FOR PROCESSING SUPPLEMENTARY PRODUCT SALES AT A POINT-OF-SALE TERMINAL, filed on Aug. 26, 1997, which issued as U.S. Pat. No. 6,119,099 on Sep. 12, 2000; which is a continuation-in-part of U.S. Patent Application Ser. No. 08/822,709, entitled SYSTEM AND METHOD FOR PERFORMING LOTTERY TICKET TRANSACTIONS UTILIZING POINT-OF-SALE TERMINALS, filed on Mar. 21, 1997, which issued as U.S. Pat. No. 6,267,670 B1 on Jul. 31, 2001, each of which are incorporated herein by reference.

CROSS REFERENCE TO RELATED APPLICATIONS

The present invention is related to the following U.S. Patent Applications filed contemporaneously herewith:

U.S. Patent Application Ser. No. 09/045,084 entitled METHOD AND APPARATUS FOR CONTROLLING OFFERS THAT ARE PROVIDED AT A POINT-OF-SALE TERMINAL, filed Mar. 20, 1998, which issued as U.S. Pat. No. 6,223,163 B1 on Apr. 24, 2001; U.S. Patent Application Ser. No. 09/045,036, entitled METHOD AND APPARATUS FOR FACILITATING THE PLAY OF FRACTIONAL LOTTERY TICKETS UTILIZING POINT-OF-SALE TERMINALS, filed Mar. 20, 1998, U.S. Patent Application Ser. No. 89/045,386, entitled METHOD AND APPARATUS FOR CONTROLLING THE PERFORMANCE OF A SUPPLEMENTARY PROCESS AT A POINT-OF-SALE TERMINAL, and now-abandoned U.S. Patent Application Ser. No. 09/045,347 entitled METHOD AND APPARATUS FOR PROCESSING A SUPPLEMENTARY PRODUCT SALE AT A POINT-OF-SALE TERMINAL filed Mar. 20, 1998, each assigned to the assignee of the present invention and incorporated by reference herein.

FIELD OF THE INVENTION

The present invention relates to point-of-sale terminals.

BACKGROUND OF THE INVENTION

Point-of-sale ("POS") terminals, such as cash registers, are used in a wide variety of businesses for performing such processes as calculating the total price of a purchase (goods or services) and calculating the amount of change due to a customer. Some POS terminals furthermore track purchases made and adjust a database of store inventory accordingly. As described in the parent application of the present application, Patent Application Ser. No. 08/920,116, entitled METHOD AND SYSTEM FOR PROCESSING SUPPLEMENTARY PRODUCT SALES AT A POINT-OF-SALE TERMINAL, filed on Aug. 26, 1997, now U.S. Pat. No. 6,119,099, a customer at a POS terminal is offered an "upsell" in exchange for an amount of change due. The POS terminal determines an upsell in dependence on a purchase of the customer, and also determines an "upsell price" (the amount of change due) based on the purchase. For example, a customer purchasing a first product for $1.74 and tendering $2.00 may be offered a second product, perhaps at an attractively discounted price, in lieu of the $0.26 change due. The upsell price, $0.26, thus depends on the purchase price $1.74; the upsell price is not fixed like most conventional prices for items.

As described in the aforementioned parent application, offering upsells in exchange for change due has significant advantages. For example, customers are typically adverse to handling change, and would welcome the opportunity to dispense with it. In addition, the customer derives satisfaction from a sale at an attractively-low price.

Typically, a business may have several different upsells that may be offered. In fact, for any particular purchase, it may be possible to offer several different upsells. The particular upsell that is actually offered to a particular customer may depend on a number of criteria associated with the purchase, such as the change amount, the time of day and the items purchased. Since there may be so many possible upsells to offer any particular customer, it may be difficult or impossible to determine which upsell that customer is likely to accept.

In addition to the difficulty of selecting an upsell to offer, offering an upsell may in some circumstances require time. However, there is no guarantee that the time spent offering an upsell will prompt the customer to accept the upsell and, consequently, provide revenue to the offeror. Thus, many offered upsells will be unaccepted, thus resulting in a waste of time and effort. Accordingly, it would be advantageous to eliminate the uncertainty that is inherent in offering upsells.

SUMMARY OF THE INVENTION

It is an object of the present invention to eliminate the uncertainty that is inherent in offering upsells.

In accordance with the present invention, upsells are made accessible to customers so customers may select upsells as they select items in their purchase. Each upsell has an associated rounding code. For example, the rounding code may be determinable from a bar code printed on an adhesive label that is affixed to the upsell. A POS terminal receives the rounding code, by scanning the label or other means. Typically, the rounding code is read in a manner similar to the manner in which items in the purchase are read by the POS terminal. The purchase price (sum of all item prices and any tax) is rounded, based on the rounding code. For example, given a purchase price of $8.26, and a rounding code that indicates a multiple of $5, the purchase price would be rounded up to the next-higher multiple of $5 ($10.00). The customer would pay the rounded price in exchange for the items and the upsell. Thus, the difference between the rounded price and the purchase price ($10.00–$8.26=$1.74) is effectively the price the customer pays for the upsell.

BRIEF DESCRIPTION OF THE DRAWINGS

FIG. 4 is a schematic illustration of an inventory database of a POS terminal.

FIG. 5 is a schematic illustration of a rounding code database of a POS terminal.

FIG. 7 is a schematic illustration that represents information relating to transactions.

DETAILED DESCRIPTION OF THE PREFERRED EMBODIMENTS

The present invention allows a customer to select an upsell before a purchase is processed at a POS terminal. Thus, the customer need not be offered a system-selected upsell at the POS terminal that may be rejected. The present invention thus may save time at the POS terminal. The selected upsell also indicates an amount to which the purchase price should be rounded, saving even more time.

If a business has old or aging inventory, it may be advantageous to allow that inventory to be selected as an upsell in exchange for change due. Customers would act to clear the inventory, and thereby eliminate the costs of otherwise disposing of the inventory.

Figure 1:
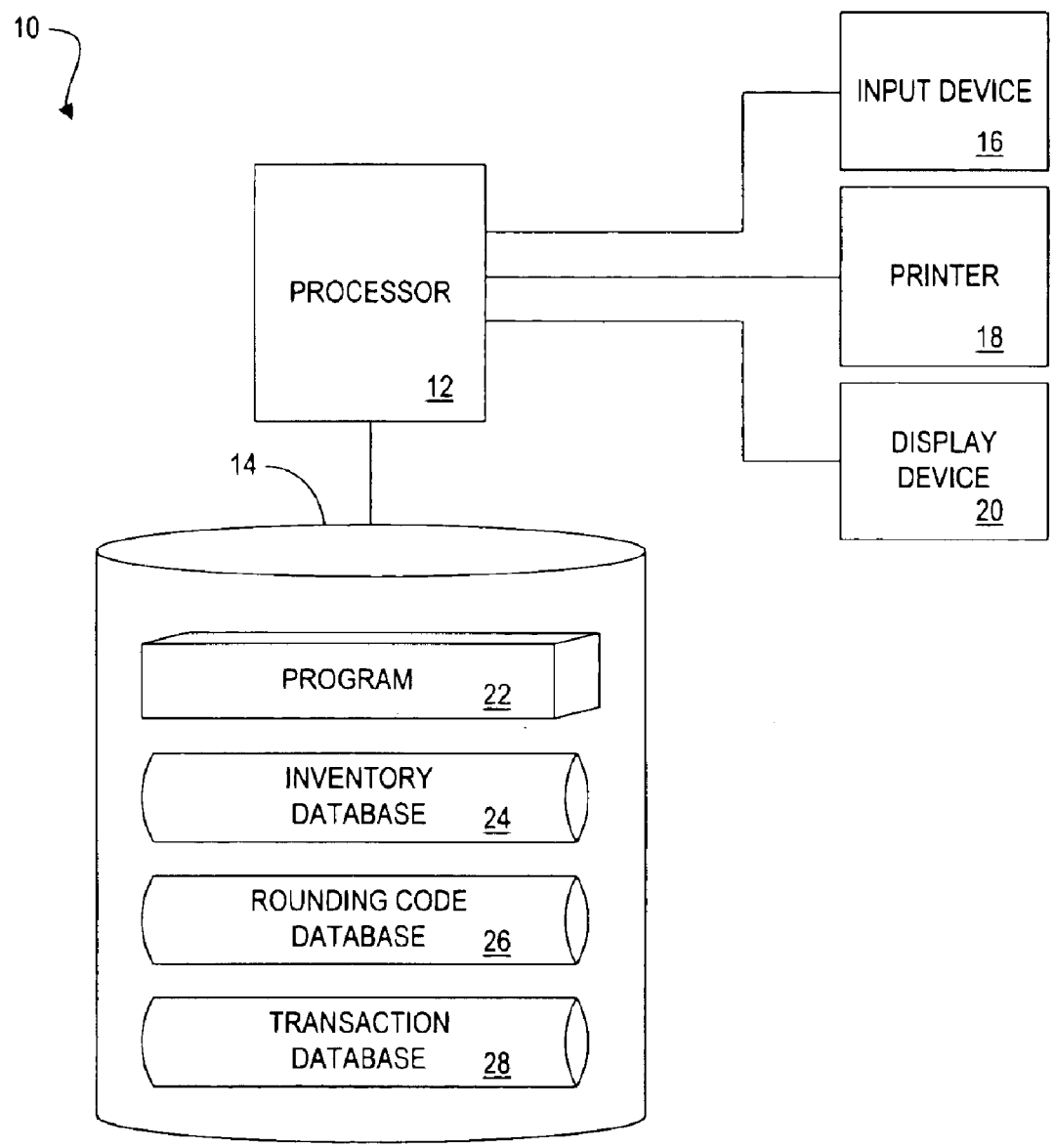
FIG. 1 is a schematic illustration of a POS terminal provided in accordance with the present invention.

Referring to FIG. 1, a POS terminal 10, which may be the IBM 4683 or IBM 4693 manufactured by International Business Machines, comprises a processor 12, such as one or more conventional microprocessors. The processor 12 is in communication with a data storage device 14, such as an appropriate combination of magnetic, optical and/or semiconductor memory. The processor 12 and the storage device 14 may each be (i) located entirely within a single computer or other computing device; (ii) connected to each other by a remote communication medium, such as a serial port cable, telephone line or radio frequency transceiver; or (iii) a combination thereof. For example, the POS terminal 10 may comprise one or more computers which are connected to a remote server computer for maintaining databases.

An input device 16 preferably comprises a keypad for transmitting input signals, such as signals indicative of a purchase, to the processor 12. The input device 16 may also comprise an optical bar code scanner for reading bar codes and transmitting signals indicative of those bar codes to the processor 12. A printer 18 is for registering indicia on paper or other material, thereby printing receipts, coupons and vouchers as controlled by the processor 12. A display device 20 is preferably a video monitor for displaying at least alphanumeric characters to the customer and/or cashier. Many types of input devices, printers and display devices are known to those skilled in the art, and need not be described in detail herein. The input device 16, printer 18 and display device 20 are each in communication with the processor 12.

The storage device 14 stores a program 22 for controlling the processor 12. The processor 12 performs instructions of the program 22, and thereby operates in accordance with the present invention, and particularly in accordance with the methods described in detail herein. The program 22 furthermore includes program elements that may be necessary, such as an operating system and "device drivers" for allowing the processor 12 to interface with computer peripheral devices, such as the input device 16, the printer 18 and the display device 20. Appropriate device drivers and other necessary program elements are known to those skilled in the art, and need not be described in detail herein.

The storage device 14 also stores (i) inventory database 24; (ii) rounding code database 26; and (iii) transaction database 28. The databases 24, 26 and 28 are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides the tables shown. Similarly, the illustrated entries represent exemplary information, but those skilled in the art will understand that the number and content of the entries can be different from those illustrated herein.

Figure 2:
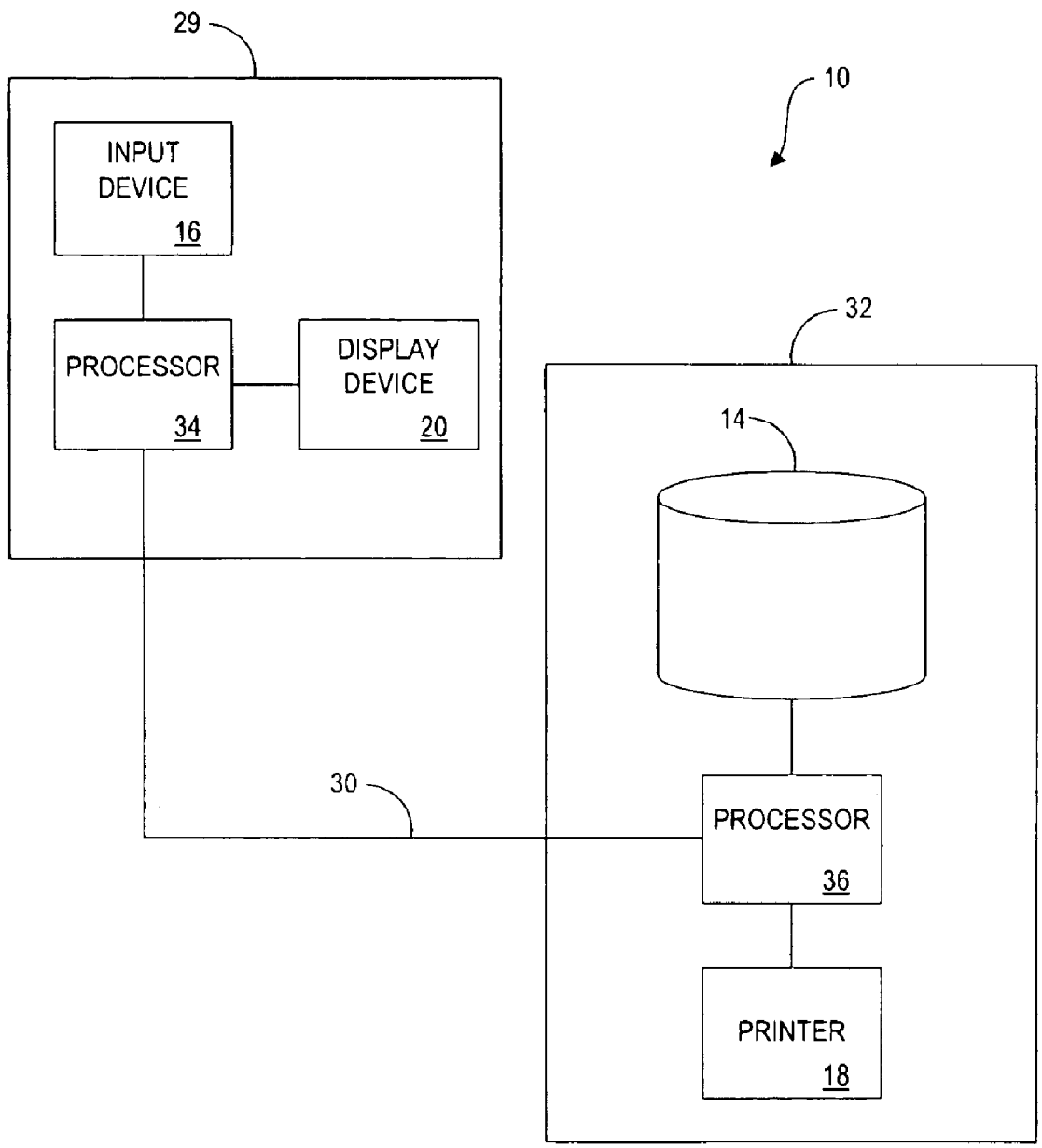
FIG. 2 is a schematic illustration of another embodiment of the POS terminal of FIG. 1.

FIG. 2 illustrates another embodiment of the POS terminal 10, in which a control device 29 is in communication via a communication medium 30 with a system 32 for providing an offer for an upsell. The control device 29 comprises a processor 34 in communication with the input device 16 and the display device 20. The system 32 for providing an offer comprises a processor 36 in communication with the storage device 14 and the printer 18. In this embodiment, the control device 29 may be a cash register, and the system 32 may be an electronic device for printing coupons in accordance with data received from the cash register. Other configurations of the POS terminal 10 will be understood by those skilled in the art.

Figure 3:
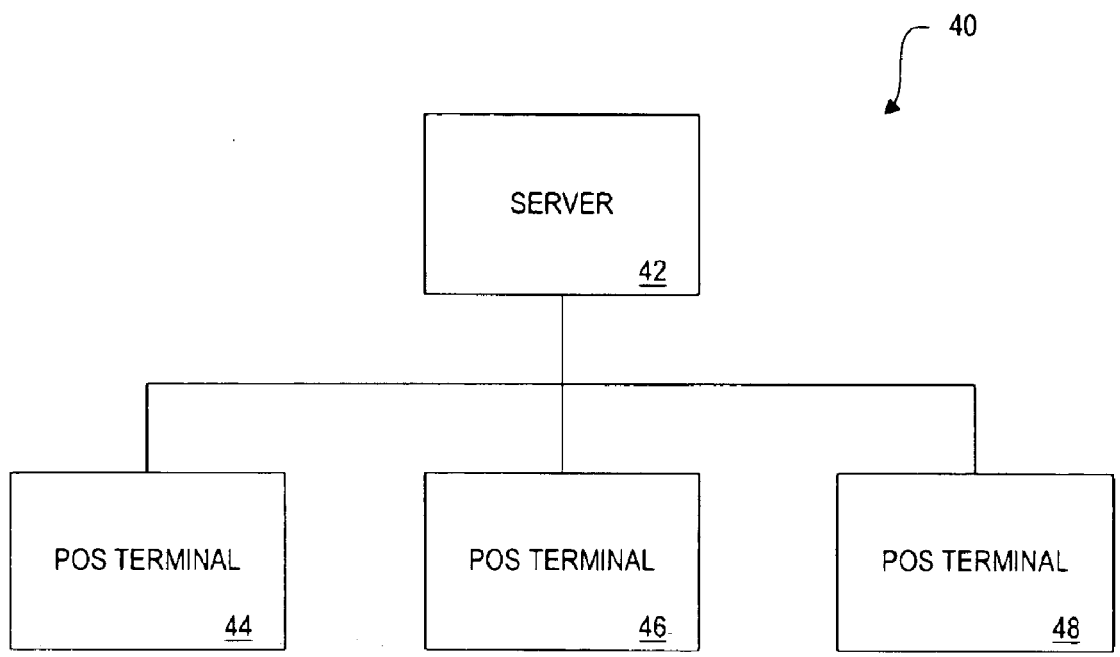
FIG. 3 is a schematic illustration of a network of POS terminals.

Referring to FIG. 3, a network 40 includes a server 42 in communication with POS terminals 44, 46 and 48. The server 42 directs the operation of, stores data from and transmits data to the POS terminals 44, 46 and 48. The server 42 may itself be a POS terminal, as described above, or may be another computing device that can communicate with one or more POS terminals. Although three POS terminals are shown in FIG. 3, any number of POS terminals may be in communication with the server 42 without departing from the spirit and scope of the present invention. Each of the POS terminals 44, 46 and 48 may be located in the same store, in different stores of a chain of stores, or in other locations. The server 42 may perform many of the processes described below, especially those processes that are performed for more than one POS terminal. The server 42 may furthermore store data, such as the inventory database 24 (FIG. 1), that is to be shared by the POS terminals 44, 46 and 48.

Referring to FIG. 4, the inventory database 24 includes rows 32, 33, 34, 35, 36, 37 and 38, each of which represents an entry of the inventory database 24. Each entry defines an item of inventory that may be sold. In particular, each entry includes (i) an item identifier 40 that uniquely identifies the entry; (ii) a description 42 that describes the item of inventory; (iii) a price 44 of the item; and (iv) a taxable status 46 that indicates whether the item is subject to sales tax (or other tax). The inventory database 24 is accessed to determine a purchase price in a manner known in the art. For example, each item of a purchase may include a bar code that can be read by a POS terminal. The price of each item, corresponding to the bar code identifier, would in turn be determined from the inventory database 24. The sum of the item prices and any appropriate taxes applied thereto would yield the purchase price.

Referring to FIG. 5, the rounding code database 26 includes rows 50, 52 and 54, each of which represents an entry of the rounding code database 26. Each entry defines a rounding code. In particular, each entry includes (i) a rounding code identifier 56 that uniquely identifies the entry; (ii) a rounding multiple 58 that indicates an amount to which a purchase price is to be rounded; and (iii) a fixed value 60 that indicates a fixed price to pay for the corresponding upsell, if the upsell is not purchased for an amount of change due. For example, a rounding code corresponding to the entry 50, identified by "567", has a rounding multiple of $1. Thus, if a purchase includes an upsell having the rounding code "567", the corresponding purchase price will be rounded to the next higher dollar amount (e.g. from $7.38 to $8.00). It can be advantageous, and simpler for customers, to set the rounding multiple of each upsell equal to the fixed price of that upsell.

The upsells are accessible to customers, allowing customers to select the upsells as they select the items of their purchase. Each upsell has a rounding code which may be determinable from a bar code printed on an adhesive label that is affixed to the upsell. For example, in a bookstore, there may be a set of bins located near the POS terminals. Each bin holds several books, each having a bar code. The customer selects a book from a bin, and brings it to the POS terminal with the items he wishes to purchase. An optical bar code scanner of the POS terminal reads the bar code of the book, and the bar codes of the items of the purchase.

Instead of a bar code, each upsell may include another indication of the corresponding rounding code. For example, each book in a first bin may be affixed with a green adhesive label, and each book in a second bin may be affixed with a blue adhesive label. In such an embodiment, the green adhesive label would indicate a first rounding code, and the blue adhesive label would indicate a second rounding code. A cashier or other operator of the POS terminal would in turn press a button or otherwise allow the POS terminal to receive data indicating the rounding code.

It can be advantageous for upsells having the same rounding code to be grouped together. For example, a first bin could contain a number of books that each have a first rounding code. A second bin could contain a number of books that each have a second rounding code. If any book from the first bin is selected as an upsell, the purchase price would be rounded to a first multiple (e.g. the nearest $5). Similarly, selecting any book from the second bin would cause the purchase price to be rounded to a second multiple (e.g. the nearest $10).

Figure 6:
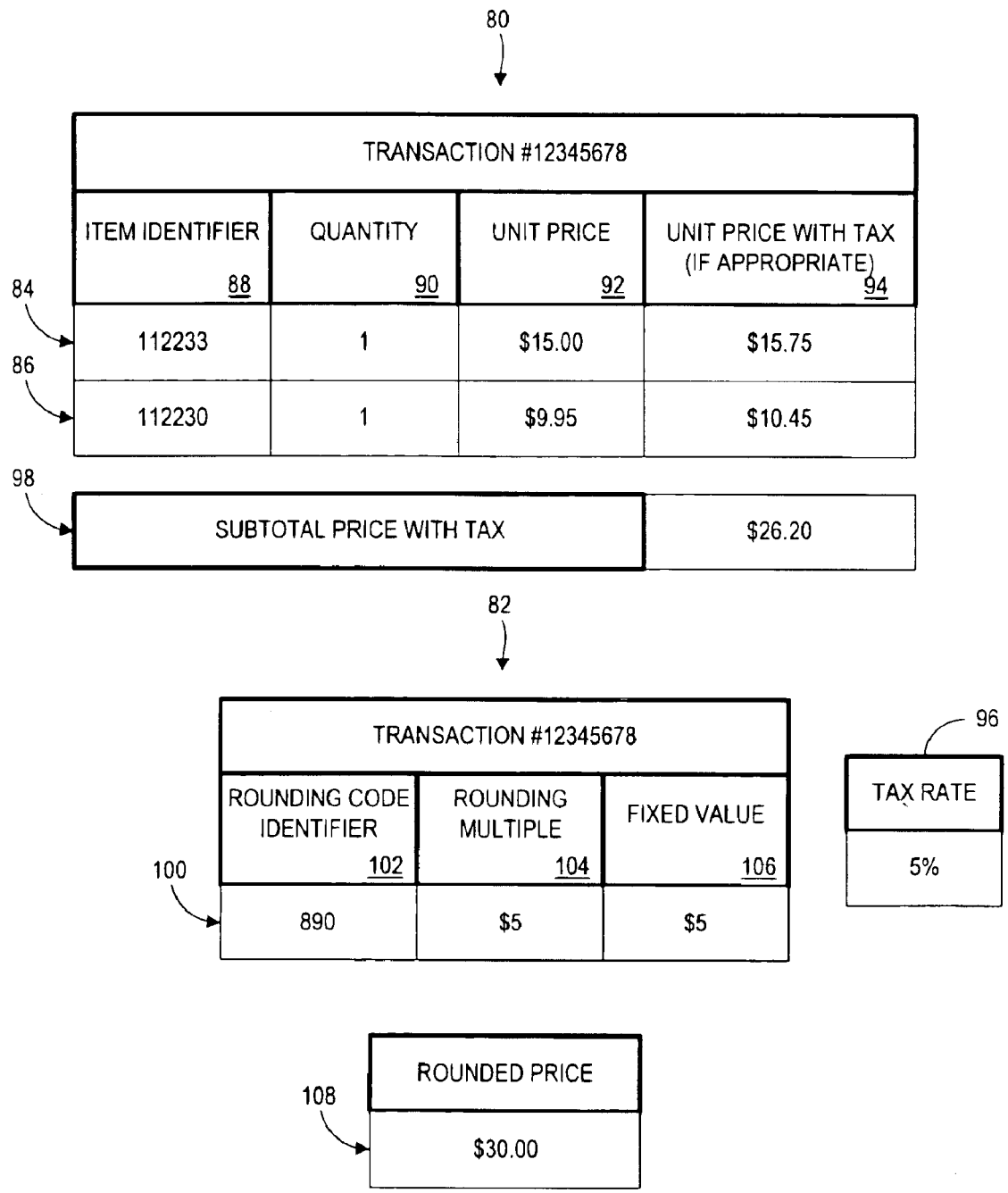
FIG. 6 is a schematic illustration of data used in determining an amount of money due as payment for items of a purchase and an upsell.

Referring to FIG. 6, the inventory database 24 and the rounding code database 26 are used in determining an amount of money due as payment for items of a purchase and an upsell. Tables 80 and 82 each represent data corresponding to a transaction identified by a transaction identifier "12345678". Accordingly, the tables 80 and 82 represent data stored in the transaction database 28 (FIG. 1). Typically, the transaction database 28 will include data representing a plurality of such transactions.

The table 80 represents one or more items included in the transaction, and the table 82 represents one or more upsells included in the transaction. The table 80 includes entries 84 and 86, each defining a type of item to purchase. Each entry includes (i) an item identifier 88 corresponding to the item identifier 40 of FIG. 4; (ii) a quantity 90 of the item; (iii) a price 92 of each unit of the item, the price corresponding to the price 44 of FIG. 4; and (iv) a price with tax 94 of each unit of the item. The price with tax of an item may be determined from the corresponding price 92, the taxable status 46 of FIG. 4 (which indicates whether the item is subject to sales tax or other tax), and a tax rate 96. Those skilled in the art will readily understand that the tax rate 96 may be, for example, stored on the storage device 14 (FIG. 1) as a database or as a variable of the program 24. The price with tax of each item is summed to yield a subtotal price with tax 98. The subtotal price with tax 98 is a price that would be due if no upsell is included in the transaction.

The table 82 includes an entry 100 that defines an upsell included in the transaction. The entry 100 includes (i) a rounding code identifier 102, corresponding to the rounding code identifier 56 of FIG. 5; (ii) a rounding multiple 104, corresponding to the rounding multiple 58 of FIG. 5; and (iii) a fixed value 106, corresponding to the fixed value 60 of FIG. 5. The rounding multiple of the entry 100 has the value $5, indicating that the subtotal price with tax 98 is to be rounded to the next higher multiple of $5. Accordingly, the subtotal price with tax 98, which has the value $26.20, is rounded to the next higher multiple of $5, yielding a rounded price 108 having the value $30.

FIG. 7 depicts a table 120 that represents further information relating to transactions. Such information may be stored in the transaction database 28 (FIG. 1) in certain embodiments of the present invention. The table 120 includes entries 122 and 124, each defining further information relating to a transaction. Each entry includes (i) a transaction identifier 126 that uniquely identifies the transaction; (ii) a date 128 on which the transaction occurred; (iii) a time 130 at which the transaction occurred; (iv) a POS terminal identifier 132 that indicates the POS terminal at which the transaction occurred; and (v) a revenue 134 that was derived from the transaction. Information represented by the table 120 may be used, for example, in determining patterns in revenue generation over time.

Figure 8:
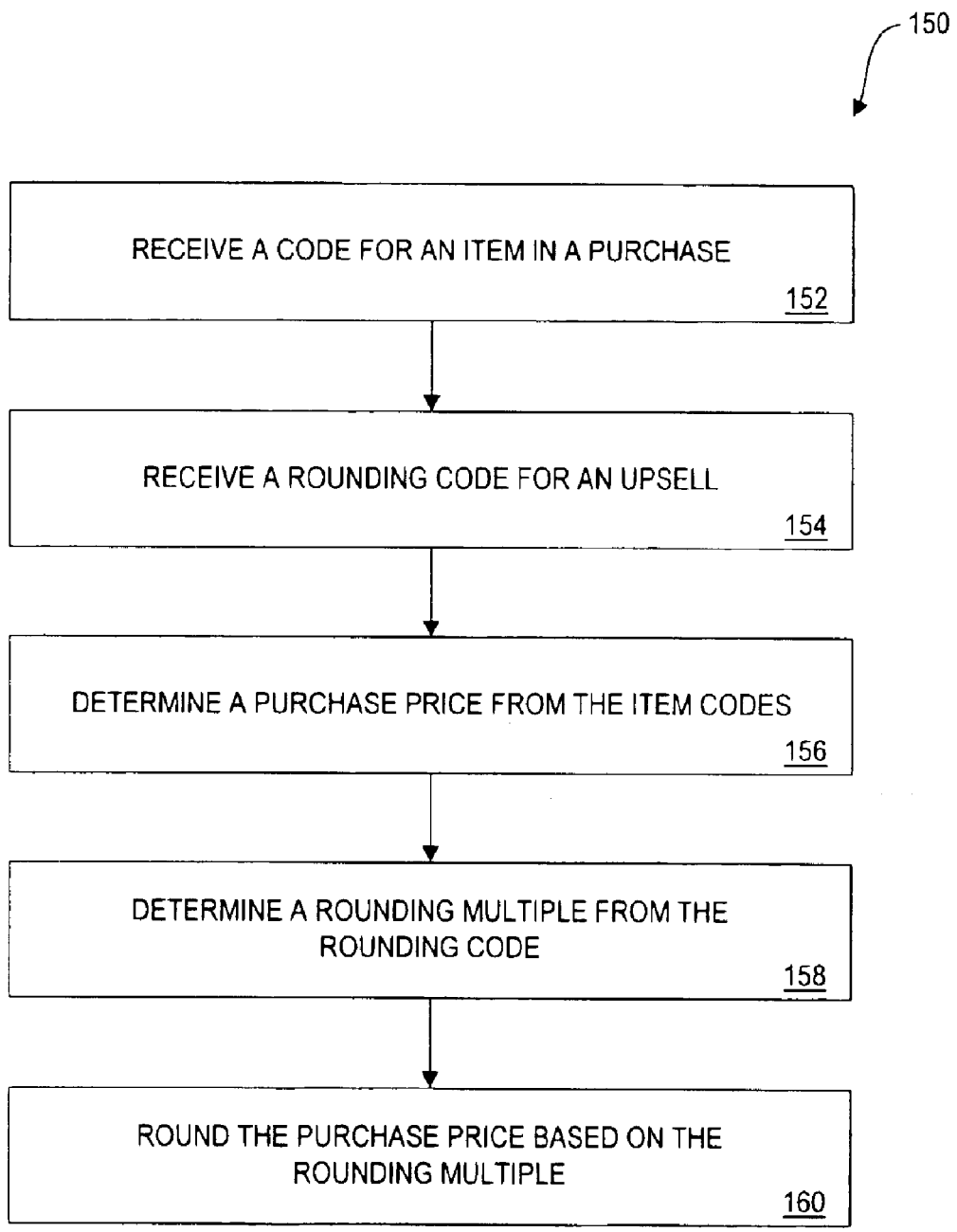
FIG. 8 is a flow chart describing a method for determining a rounded price for a purchase that includes an upsell and one or more items.

FIG. 8 illustrates a method 150 in which the above-mentioned databases are used in determining a rounded price for a purchase that includes an upsell and one or more items. A POS terminal receives a code for each item in the purchase (step 152). For example, a bar code scanner reads a bar code imprinted on each item and generates signals indicative of the bar code. The POS terminal also receives a rounding code for an upsell (step 154). Those skilled in the art will understand that the rounding code may be received before, during or after the receiving of the item codes. After all codes are received, the POS terminal determines a purchase price from the item codes (step 156). As described above with reference to FIG. 6, the purchase price is determined by summing the price with tax of each item. The POS terminal determines a rounding multiple from the rounding code (step 158) by accessing the rounding code database 26 (FIG. 1). Based on the rounding multiple, the POS terminal rounds the purchase price to yield a rounded price (step 160). The rounded price is the price due in exchange for the items and the upsell.

In the embodiments described above, one upsell was included in a purchase. However, a plurality of upsells may be included in a purchase. In such an embodiment, one upsell would be sold in exchange for change due, while the remaining upsells would be sold at a fixed price. As described above with reference to FIG. 5, each rounding code has both a fixed price and a rounding multiple. Thus, a fixed price may be determined for each upsell.

Figure 9:
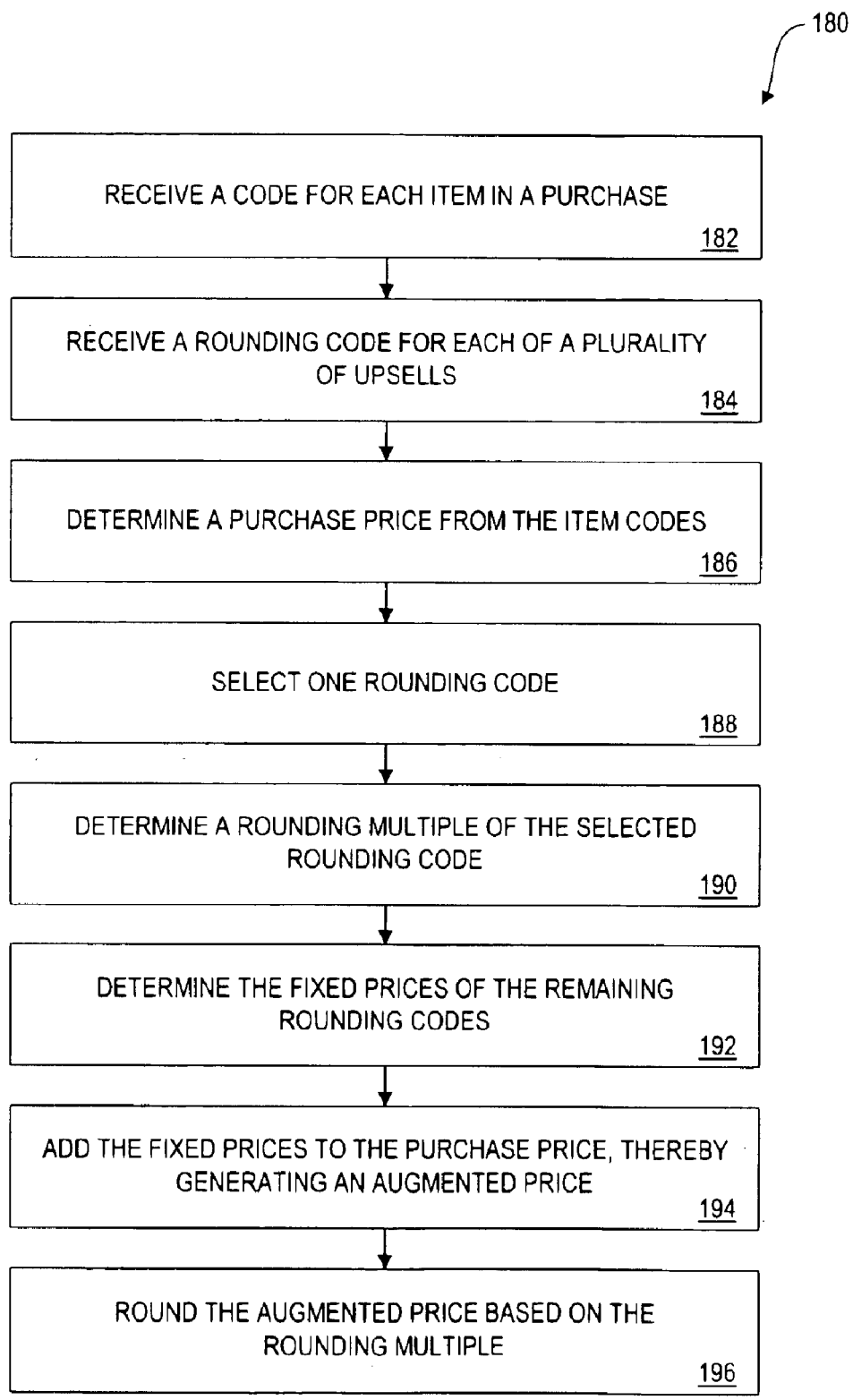
FIG. 9 is a flow chart describing a method for determining a rounded price for a purchase that includes a plurality of upsells and one or more items.

FIG. 9 illustrates a method 180 for determining a rounded price for a purchase that includes a plurality of upsells with rounding codes. The POS terminal receives a code for each item in a purchase (step 182) and also receives a rounding code for each of a plurality of upsells (step 184). As described above, a purchase price is determined from the item codes (step 186).

One of the rounding codes is selected (step 188), and its rounding multiple is determined (step 190). The selection defines a selected rounding code and a set of unselected rounding codes. The set of unselected rounding codes may consist of one rounding code (if there are two rounding codes) or more than one rounding code. The choice of which rounding code is selected may depend on different criteria. In one embodiment, the POS terminal selects a rounding code having the smallest (minimal) rounding multiple. That is, the POS terminal selects a rounding multiple that is not greater than the rounding multiple of each unselected rounding code. For example, if there are three rounding codes, having corresponding rounding multiples of $5, $5 and $10, then either of the first two rounding codes (having rounding multiples of $5) would be selected.

Once a rounding code is selected, the fixed price of each remaining (unselected) rounding code is determined (step 192). As described above, the fixed prices are determinable from the rounding code database 26 (FIGS. 1 and 5). These fixed prices are added to the purchase price determined at step 186, thereby generating an augmented price (step 194). This augmented price is rounded based on the rounding multiple determined at step 190, thereby generating a rounded price (step 196). This rounded price is exchanged for the items and the upsells included in the purchase. Those skilled in the art will understand that the step 196 may be performed before the step 194, rather than after.

Figure 10:
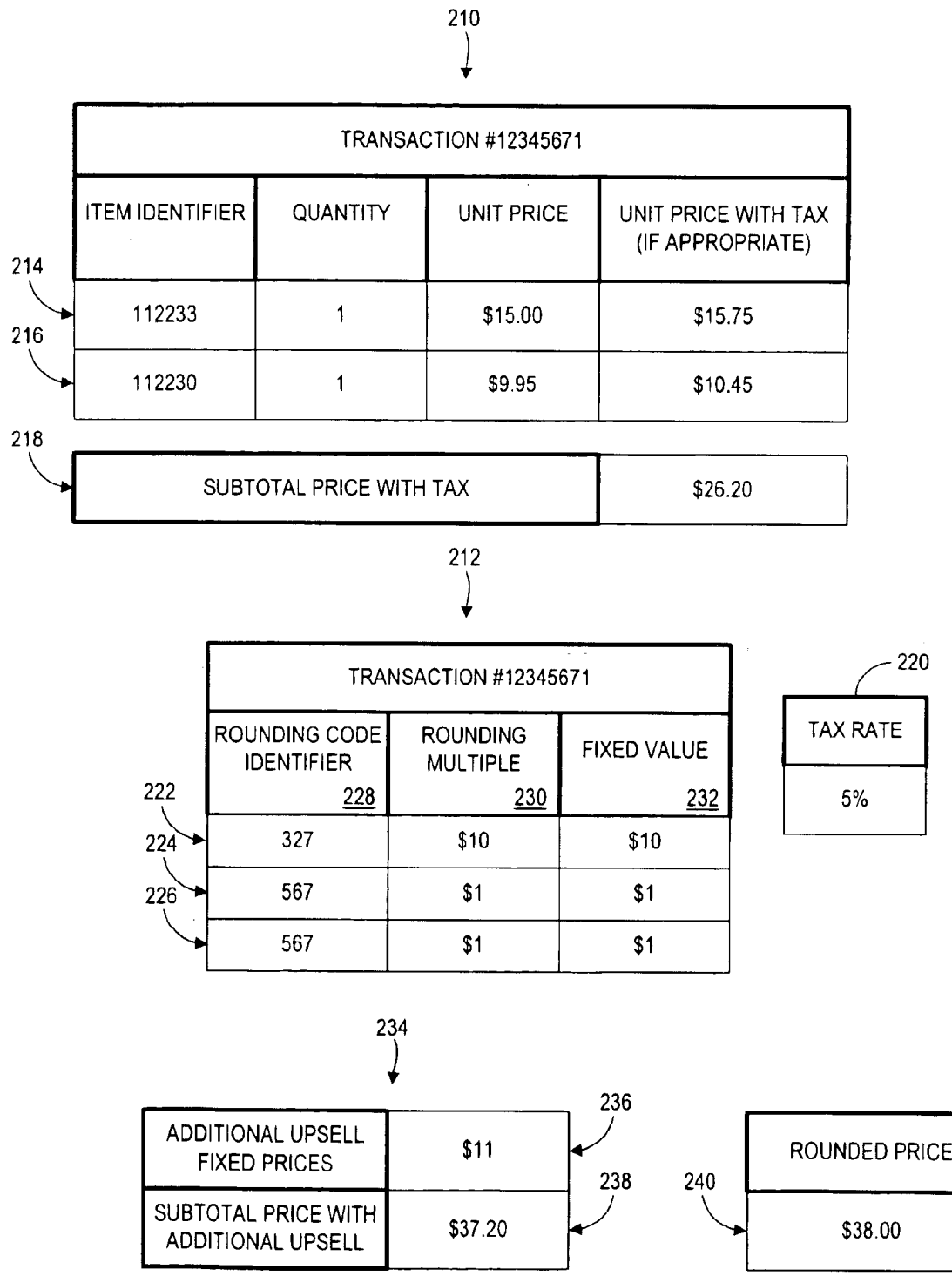
FIG. 10 is a schematic illustration of data used in determining an amount of money due as payment for items of a purchase and a plurality of upsells.

Referring to FIG. 10, tables 210 and 212 each represent data corresponding to a transaction identified by a transaction identifier "12345671". Accordingly, the tables 210 and 212 represent data stored in the transaction database 28 (FIG. 1). The table 210, similar to the table 80 of FIG. 6, represents one or more items included in the transaction, and the table 212, similar to the table 82 of FIG. 6, represents upsells included in the transaction. The table 210 includes entries 214 and 216, each defining a type of item to purchase. A subtotal price with tax 218 and tax rate 220 function as those described above with respect to FIG. 6.

The table 212 includes entries 222, 224 and 226 that each define an upsell included in the transaction. Similar to the table 82 (FIG. 6), each entry of the table 212 includes (i) a rounding code identifier 228, corresponding to the rounding code identifier 56 of FIG. 5; (ii) a rounding multiple 230, corresponding to the rounding multiple 58 of FIG. 5; and (iii) a fixed value 232, corresponding to the fixed value 60 of FIG. 5. As described above, one upsell is selected to define a rounding multiple, and the remaining upsells have fixed prices that are added to the subtotal price with tax. In accordance with an embodiment described above, in the example described by FIG. 10 an upsell having a minimal rounding multiple is selected. Such an upsell may be either upsell defined by the entries 224 and 226, each having a rounding multiple of $1. Accordingly, the remaining two upsells have fixed prices of $1 and $10.

A table 234 represents the use of the fixed prices of the upsells. The additional upsell fixed prices 236, which is the sum of the fixed prices of the remaining (unselected) upsells, is $11. Thus the subtotal price with the additional upsells 238 is the sum of $26.20 and $11, which is $37.20. This subtotal price is rounded in accordance with the rounding multiple of the selected upsell ($1), generating a rounded price 240 of $38.00.

In another embodiment of the present invention, each upsell may have a corresponding "minimum price", which is a minimum difference between the subtotal price with tax and the rounded price. For example, if a subtotal price with tax is $4.98, and a corresponding rounding multiple is $5.00, then the rounded price would normally be $5.00 (only $0.02 extra). However, if a minimum price for the upsell is $2.00, then a rounded price of $7.00 ($4.98+$2.00 rounded up to the nearest dollar) is generated.

Although the present invention has been described with respect to a preferred embodiment thereof, those skilled in the art will note that various substitutions may be made to those embodiments described herein without departing from the spirit and scope of the present invention.

What is claimed is:

1. A method comprising:

scanning a bar code on at least one item;

determining a purchase price for a purchase including the at least one item;

receiving a rounding code from a first item not included in the purchase;

determining a rounding multiple corresponding to the rounding code;

rounding the purchase price based on the rounding multiple; and allowing an exchange of the at least one item and the first item for the rounded purchase price.

2. A method comprising:

scanning a bar code on at least one item;

determining a purchase price for a purchase including the at least one item;

receiving a rounding code from a first item not included in the purchase;

determining a rounding multiple corresponding to the rounding code;

rounding the purchase price based on the rounding multiple; and receiving the rounded purchase price in exchange for the at least one item and the first item.

3. A method comprising:

scanning a bar code on at least one item;

determining a purchase price for a purchase including at least one item;

receiving a rounding code from a first item not included in the purchase;

selecting a rounding multiple from a plurality of rounding multiples based on the received rounding code;

rounding the purchase price based on the selected rounding multiple; and receiving the rounded purchase price in exchange for the at least one item and the first item.

4. A method comprising:

receiving a signal indicative of at least one item from a customer;

determining a price for the at least one item;

receiving a signal indicative of a scanned bar code on a first item not included in the at least one item;

selecting an integer from a plurality of integers based on the scanned bar code, in which at least one of the plurality of integers is "1";

determining a rounded price based on the price and the selected integer, in which the rounded price is a lowest multiple of the selected integer that is greater than the price;

setting the rounded price as required payment for the at least one item and the first item; and registering the rounded price as being paid for by the customer.

5. A method comprising:

receiving at least one item from a customer;

receiving a first item from a customer, in which the first item is not included in the at least one item;

scanning a bar code on the at least one item;

determining a price for the at least one item;

determining a rounding multiple based on the first item;
determining a rounded price based on the price and the rounding multiple, in which the rounded price is a lowest multiple of the selected integer that is greater than the price;
charging the customer the rounded price for the at least one item and the first item; and
receiving payment of the rounded price from the customer.

6. A method comprising:
receiving at least one item from a customer;
receiving a first item from a customer, in which the first item is not included in the at least one item;
determining a price for the at least one item;
scanning a bar code on the first item;
selecting an integer from a plurality of integers based on the scanned bar code, in which at least one of the plurality of integers is "1";
determining a rounded price based on the price and the selected integer, in which the rounded price is a lowest multiple of the selected integer that is greater than the price;
charging the customer the rounded price for the at least one item and the first item; and
receiving payment of the rounded price from the customer.

7. A method comprising:
receiving a plurality of items from a customer, each item having a bar code;
scanning the bar code on each of the plurality of items;
selecting an integer from a plurality of integers based on one of the scanned bar codes;
determining a price of a subset of the plurality of items, the subset not including the item corresponding to the one of the scanned bar codes;
determining a rounded price based on the price and the selected integer, in which the rounded price is a lowest multiple of the selected integer that is greater than the price;
charging the customer the rounded price for the plurality of items; and
receiving payment of the rounded price from the customer.

* * * * *